United States Patent [19]
Spirakis et al.

[11] Patent Number: 5,867,668
[45] Date of Patent: Feb. 2, 1999

[54] METHOD AND APPARATUS FOR DATA TRANSFER AND STORAGE IN A HIGHLY PARALLEL COMPUTER NETWORK ENVIRONMENT

[75] Inventors: Charles S. Spirakis, Santa Clara; Steven E. Kullick, Saratoga, both of Calif.

[73] Assignee: Apple Computer, Inc., Cupertino, Calif.

[21] Appl. No.: 643,129

[22] Filed: May 2, 1996

Related U.S. Application Data

[63] Continuation of Ser. No. 6,550, Jan. 21, 1993, abandoned.

[51] Int. Cl.$^6$ ............................. G06F 13/38; G06F 15/17
[52] U.S. Cl. .............................. 395/200.64; 395/200.42
[58] Field of Search ........................ 395/200.31, 200.41, 395/300.42, 200.47, 200.64; 707/2, 10; 711/111, 112

[56] References Cited

U.S. PATENT DOCUMENTS

| | | | |
|---|---|---|---|
| 5,133,065 | 7/1992 | Cheffetz et al. | 395/575 |
| 5,218,695 | 6/1993 | Noveck et al. | 395/600 |
| 5,239,647 | 8/1993 | Anglin et al. | 395/600 |
| 5,263,154 | 11/1993 | Eastridge et al. | 395/575 |
| 5,276,860 | 1/1994 | Fortier et al. | 395/575 |
| 5,276,867 | 1/1994 | Kenley et al. | 395/600 |
| 5,313,631 | 5/1994 | Kao | 395/600 |
| 5,341,493 | 8/1994 | Yanai et al. | 395/425 |
| 5,367,698 | 11/1994 | Webber et al. | 395/800 |
| 5,386,545 | 1/1995 | Gombos, Jr. et al. | 395/575 |

FOREIGN PATENT DOCUMENTS

| | | |
|---|---|---|
| 0216170 | 4/1987 | European Pat. Off. . |
| 0259912 | 3/1988 | European Pat. Off. . |
| 0332210 | 3/1989 | European Pat. Off. . |
| 0359384 | 3/1990 | European Pat. Off. . |
| 9214204 | 8/1992 | WIPO . |

OTHER PUBLICATIONS

"Retrospect Remote Premier Network Backup Software for the Macintosh, User's Guide", Dantz Development Corporation, Berkeley, CA, 1989, 1990, 1991, 1992, 1993, pp. 11–13, 21–28, 45–49, 63–66.

"Retrospect Remote Powerful Backup Software for the Macintosh, User's Guide", Dantz Development Corporation, Berkeley, CA, 1989, 1990, 1991, 1992, 1993, pp. 15–18, 25–85, 187–194.

*Primary Examiner*—Mark H. Rinehart
*Attorney, Agent, or Firm*—Helene Plotka Workman

[57] ABSTRACT

A method and apparatus for sharing a single storage device among an arbitrarily large number of parallel processes with typically no wasted memory space and continued operations even when an error or interrupt occurs is disclosed. In a networked computer system having a communication network connecting a primary storage device between one or more computer devices and a secondary storage device, when some type of interrupt is generated or an error condition occurs or is otherwise indicated, a transfer of data from primary to secondary storage is indicated. A state indicator having at least a non-backup and a backup state may be set to the backup state to indicate that a data transfer from the primary storage device to the secondary storage device should occur. Alternatively, the transfer from the primary to the secondary storage device can begin without the use of a state indicator.

When the state indicator is in the backup state, a predetermined maximum number of processes will work on transferring data from the primary storage device to the secondary storage device. Other processes will transfer data from the computer to the primary storage device. The process which completes the transfer of data from the primary storage device to the secondary storage device then resets the state indicator to its normal state. Preferably, other processes which are already executing at the time when the state indicator is set to the backup state continue to execute to completion.

17 Claims, 3 Drawing Sheets

METHOD AND APPARATUS FOR DATA TRANSFER AND STORAGE IN A HIGHLY PARALLEL COMPUTER NETWORK ENVIRONMENT

RELATED APPLICATIONS

This is a continuation of U.S. application Ser. No. 08/006,550, filed Jan. 21, 1993, now abandoned.

This application is related to co-pending application entitled "METHOD AND APPARATUS FOR TRANSFERRING AND STORING DATA FROM AN ARBITRARILY LARGE NUMBER OF NETWORKED COMPUTER STORAGE DEVICES", filed concurrently herewith, which was commonly assigned or subject to an obligation of assignment to the same person at the time of invention.

FIELD OF THE INVENTION

This invention relates generally to data transfer and storage and more specifically to a method and system for sharing a single storage resource among a plurality of parallel processes.

BACKGROUND OF THE INVENTION

A computer or a network of computers may be connected to one or more backup storage devices to provide greater amounts of low cost storage onto which the computers can create archival or backup copies of their files for later recovery if the original files are lost or corrupted. Typically, data is copied from a computer first to a primary storage device and subsequently copied from the primary storage device to a lower cost, higher density secondary storage device such as a magnetic tape or an optical disk. Typically, the secondary storage device is slower than the primary storage device. The transfer of data from the primary storage device to the secondary storage device typically begins when the amount of used storage space on the primary storage device equals or exceeds a predetermined amount or percentage, known as a "high water mark".

The purpose of using a "high water mark" is to reduce the chance that substantially all of the memory on the primary storage device will be used up, thereby causing the primary storage device to become inoperative. The high water mark is set to a value which is based upon the rate of data coming into the primary storage device and the rate of data transfer from the primary storage device to the secondary storage device. Since the rate of incoming data to the primary storage device usually exceeds the rate of data transferred from that device to a secondary storage device, the high water mark, in effect, creates a buffer so that the memory of the primary storage device is not used up, causing that device to become inoperative.

Even with this buffer area, if the rate of data being written to the primary storage device exceeds the rate of data being transferred from that device to the secondary storage device, the primary storage device will become inoperative. Moreover, setting a low "high water mark" may reduce the chance that this will occur, at the expense of wasting storage resources on the primary storage device. However, even a low "high water mark" can not guarantee that the primary storage device will not fill up.

Additional problems arise when high water marks are used in a parallel processing computer system. Since the number of parallel processes is directly related to the rate of incoming data to the primary storage device, i.e. the more processes the faster the rate. The high water mark should be recalculated and adjusted as the number of parallel processes changes. These recalculations can be quite cumbersome and time-consuming and could still ultimately be inadequate.

On the other hand, not recalculating the high water mark when the number of processes changes can produce other problems. If the high water mark is not recalculated when the number of processes increases, then the rate of incoming data to the primary storage device may exceed the rate of data transfer from the primary device to the secondary device, because more processes are writing to the storage device. Similarly, when the number of processes decreases, not recalculating the high water mark may lead to wasted space, because the high water mark is set too low, creating a buffer having a larger size than necessary.

SUMMARY OF THE INVENTION

This invention provides a method and apparatus for sharing a single storage device among an arbitrarily large number of parallel processes with typically no wasted memory space and continued operation even when an error condition or interrupt occurs. Briefly, according to the invention, in a networked computer system having a communication network connecting a primary storage device between one or more computer devices and a secondary storage device, when some type of interrupt is generated or an error condition occurs or is otherwise indicated, a transfer of data from primary to secondary storage is initiated. The transfer may be initiated by setting a state indicator having at least a non-backup state and a backup state to the backup state to indicate that a data transfer from the primary storage device to the secondary storage device should occur. Alternatively, the transfer may be initiated by beginning the transfer of data from the primary to the secondary storage device without the use of a state indicator.

For example, when a process attempts to write data to a disk and encounters an error condition because there is insufficient disk space available to accommodate the write request, that process performs one of the following three actions. It begins transferring data from the primary storage device to the secondary storage device without setting a state indicator. Alternatively, it begins transferring data from the primary storage device to the secondary storage device and sets a state indicator to the backup state to alert other processes that such a data transfer should occur. Otherwise, the process sets the state indicator to the backup state and does not begin transferring data from the primary storage device to the secondary storage device.

Parallel processes may be used to transfer data among devices connected to the network. Preferably, the number of processes working on transferring data from the primary storage device to the secondary storage device will be less than or equal to a predetermined maximum number of processes. The other processes will transfer data from the computer to the primary storage device. When a state indicator is used, the process which completes the transfer of data from the primary storage device to the secondary storage device then resets the state indicator to its normal state. Although, setting a maximum number of processes for performing data transfer operations between the primary storage device and the secondary storage device increases efficiency, the invention may be used without setting such a limit on the number of processes. Preferably, processes which are already executing at the time when the interrupt or error condition occurs and did not themselves encounter the error or interrupt continue to execute to completion.

Since a portion of the primary storage device's memory is not allocated as a memory buffer, the invention typically eliminates wasted memory on the primary storage device and eliminates the other problems inherent in the use of a high water mark approach in a highly parallel environment. Unlike prior systems employing a high water mark approach, the invention handles error conditions or interrupts by changing to a backup state and performing archiving operations, rather than causing the system to fail, and without affecting other processes that may exist. Thus, the invention allows an arbitrary number of parallel processes to execute without the need for recomputation and interprocess communications when a process is added or removed, thereby permitting a substantially unlimited number of parallel processes to share a single storage device.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENT

Figure 1:
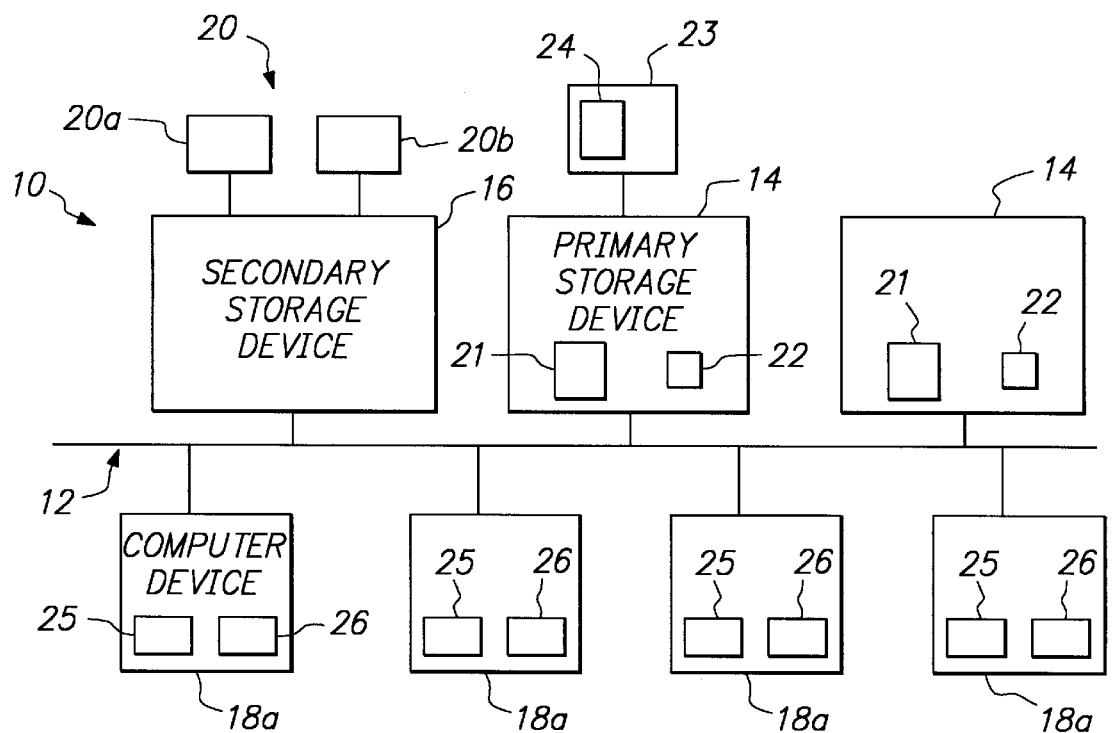
FIG. 1 illustrates a general view of the networked computer system.

Referring to FIG. 1 of the drawings, reference numeral 10 designates generally a networked computer system having a communication network 12 linking together at least one primary storage device 14, at least one secondary storage device 16 and at least one computer device 18. Communication network 12 can be a local-area network, high-speed bus or other interconnecting mechanism for exchanging messages and data, such as AppleTalk, Ethernet or Token Ring.

Storage devices 14 and 16 can each be a specialized storage device designed for the efficient storage, archival and retrieval of data, or can be a computer augmented with greater storage volumes and devices or can be a minicomputer or large computer providing storage service in addition to other functions. A primary storage device 14 has a memory 21 and a central processing unit ("CPU") 22. An external memory storage unit 23 having a memory 24 may be connected to the primary storage device 14. Preferably, the secondary storage device 16 is a parallel processor such as a Cray Y-MP2E/232 (Cray Research, Cray Research Park, Eagan, Minn.) connecting with one or more external storage devices 20 such as a tape robot 20a or an optical disk unit 20b.

Computer devices 18 can be any of personal computers, workstations, minicomputers or large computers, or other specialized computing devices or peripherals attached to the communication network. A computer device 18a includes a memory 25 and a central processing unit ("CPU") 26. A computer device 18a may include a plurality of disks (not shown) or other storage resources, each having a memory.

Figure 2:
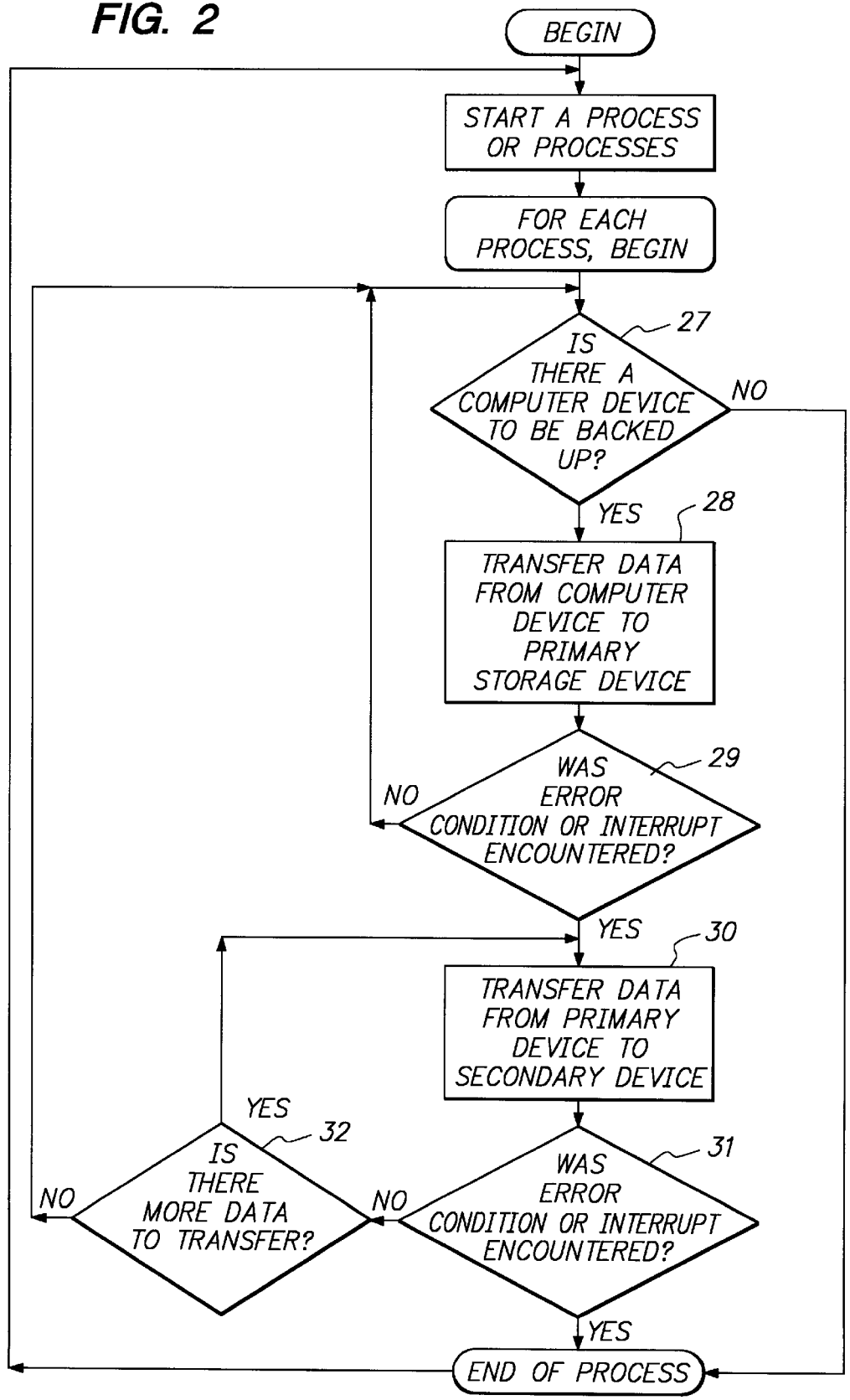
FIG. 2 shows a flow chart of the process steps of a method according to the invention without the use of a state indicator.

As shown in FIG. 2, a process or a plurality of parallel processes are created to transfer data among computer devices, primary storage devices and secondary storage devices. At block 27, if there is a computer device to be backed up, then at block 28, each process attempts to transfer data from a computer device to a primary storage device. At decision block 29, if an error condition or interrupt was encountered during that data transfer, then, at block 30, that process begins transferring data from the primary storage device to the secondary storage device or that process creates another process to perform the data transfer.

At decision block 31, if an error condition or interrupt was encountered during the transfer of data from the primary storage device to the secondary storage device, then that process is terminated. Alternatively, that process could try to backup another computer device at decision block 27. If at decision block 31 an error condition was not encountered, then at decision block 32 if there is more data to transfer from the primary storage device to the secondary storage device, data is transferred at block 30. If at decision block 32 there is no more data to transfer, then if at decision block 27 there is another computer device to be backed up, data is transferred from that computer device to the primary storage device at block 28. If at decision block 27 there are no more computer devices to be backed up then the process is terminated. If at decision block 29 an error condition or interrupt was not encountered then the process tries to backup another computer device at block 27.

Figure 3A:
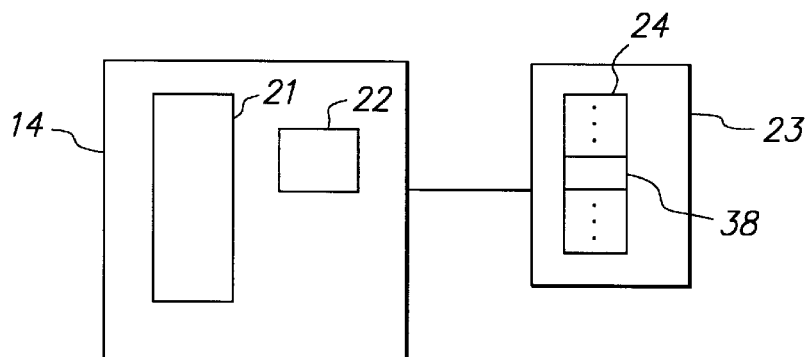
FIGS. 3A and 3B show different states of operation of a primary storage device.
Figure 3B:
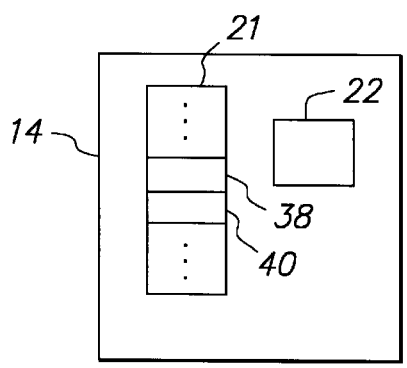

FIGS. 3A and 3B show a state indicator 38. In FIG. 3A the state indicator 38 is stored in the memory 24. Alternatively, as shown in FIG. 3B, the state indicator 38 may be stored in memory 21.

The state indicator 38 has at least a first state and a second state, the second state is a backup state indicating that data should be transferred from the primary storage device 14 to the secondary storage device 16. For example, the state indicator may be a boolean value having a first state equal to zero and a second state equal to non-zero. The state indicator 38 may have any number of states, as long as at least one of the states indicates that a data transfer from the primary storage device 14 to the secondary storage device 16 (FIG. 1) should occur.

The state indicator 38 is set to the backup state when an interrupt or error condition occurs or is otherwise indicated.

Preferably, memory 21 also contains a number of processes indicator 40, indicating the number of processes which are currently performing data transfer 16. When the state indicator 38 is not in the backup state, i.e. a transfer from the primary storage device to the secondary storage device is not indicated, the number of processes indicator is preferably set to a value such as zero, a null value, etc. which indicates that there are not any processes performing data transfer operations from the primary storage device to the secondary storage device.

Figure 4:
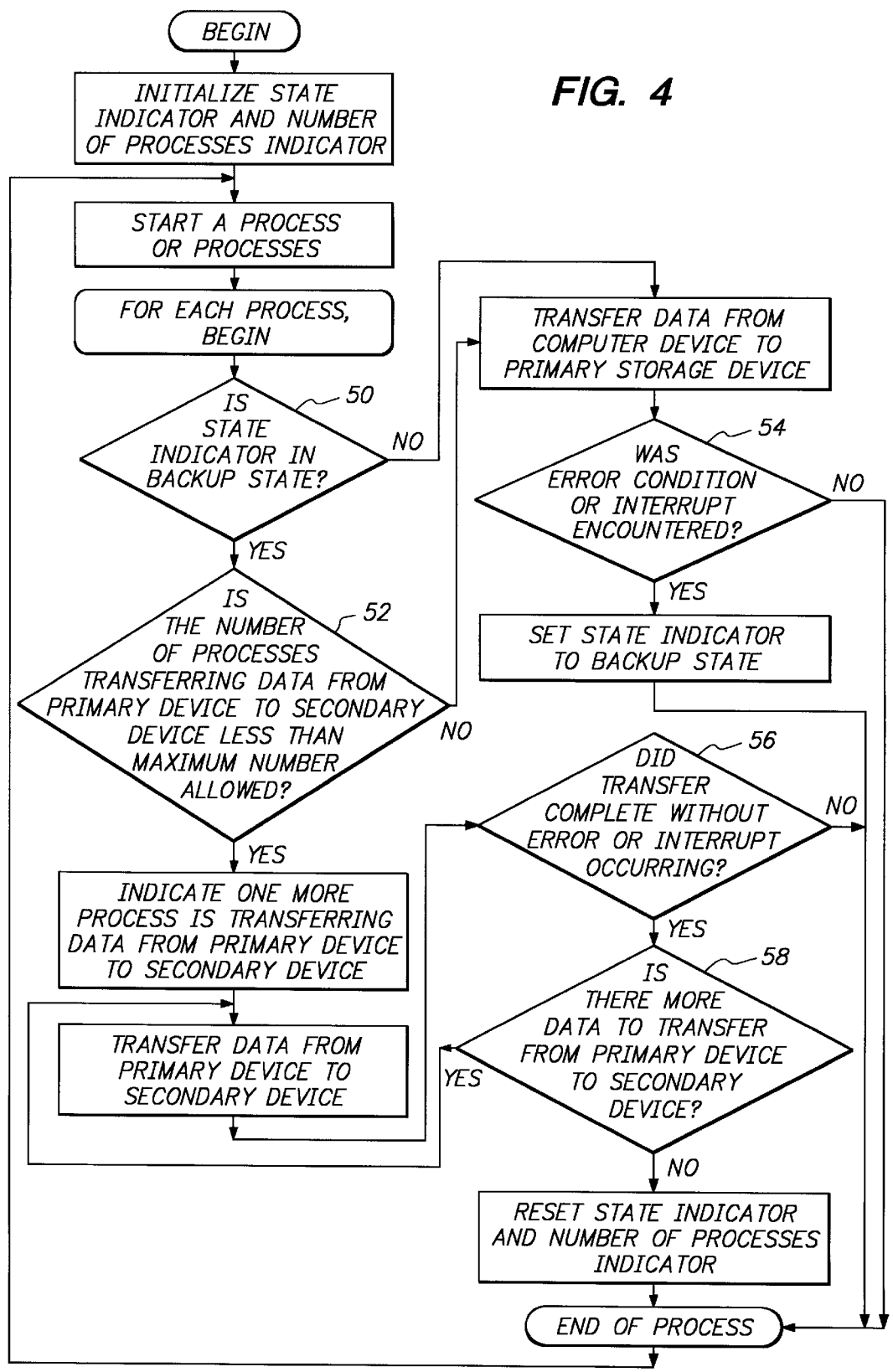
FIG. 4 shows a flow chart of the process steps of a method according to the invention with the use of a state indicator.

In use as shown in FIG. 4, a state indicator 38 and a number of processes indicator 40 for indicating the number of processes performing data transfer operations from a primary storage device to a secondary storage device are initialized. CPU 22 starts a process or a plurality of parallel processes for backing up the data in memory 25 of a computer 18a. These processes may be started at any time and, typically, are created in such a way to substantially continuously perform backup operations. The number of processes for performing such backup operations can be determined by the length of time it takes for each process to complete its operations or tasks, and to a lesser extent, by the ratio of data produced by each process to the storage capacity of the primary storage device 12.

At decision block 50, each process checks the value of the state indicator 38. If the state indicator 38 is not in the backup state, the process transfers data from the computer device 18*a* to the primary storage device 12. If at decision block 54 an error condition occurs or is otherwise indicated or some other type of interrupt occurs, the state indicator is set to the backup state. Otherwise, the process terminates or, alternatively, performs backup operations on another computer device, disk, or other storage resource.

On the other hand, if at decision block 50 the state indicator 38 is in the backup state, then at decision block 52 the process compares the number of processes indicator 40 to a predetermined maximum number of processes value. This maximum value may depend on the type of external storage devices 20 (FIG. 1) connected to the secondary storage device 16. If the device 20 is a tape drive, then the maximum number of processes can depend on the number of read/write heads on that drive, since each process generally requires two read/write heads. If the device 20 is an optical disk, then the number of processes can be limited by the throughput and speed of the device.

At decision block 52, if the number of processes indicator 40 is less than the maximum number of processes then the process will increment the number of processes by one and then transfer data from the primary storage device 14 to the secondary storage device 16. At decision block 56 if the data transfer was completed without an error condition or interrupt occurring and there is more data to transfer at decision block 58, the process continues transferring data from the primary to the secondary storage device. If at decision block 58 there is not any more to transfer from the primary to the secondary storage device, the state indicator 38 and the number of processes indicator 40 are reset and the process terminates. If at decision block 56 an error condition or interrupt was encountered then the process terminates.

If at decision block 52 the number of processes indicator 40 is equal to or exceeds the maximum number of processes value, then the process will transfer data from the memory 25 of the computer device 18 to the memory 21 of the primary storage device 14.

There are other equivalent means for determining whether the number of processes currently transferring data from storage device 14 to storage device 16 has reached a predetermined maximum number of processes. For example, a counter could be set to the maximum number and then decreased each time before a new process begins transferring data from device 14 to device 16. When the counter reaches zero, the maximum has been reached. There are other equivalent means which would be obvious to someone skilled in the relevant art and which fall within the spirit and scope of this invention. Additionally, it is possible to implement the invention without tracking the number or state of concurrent processes. For example, the number of processes may be determined by hardware or other resource limitations, rather than by a number of processes indicator 40.

If the process performs backup operations which complete the data transfer from the primary storage device 14 to the secondary storage device 16, the process resets the state indicator 38 to a state other than the backup state, preferably the first state, and resets the number of processes indicator 40 to indicate that no processes are currently transferring data from device 14 to device 16. Preferably, indicator 40 is set to zero.

If at decision block 52 the number of processes transferring data from the primary to the secondary storage device are equal to or greater than the maximum number allowed, the process transfers data from the computer device 18*a* to the primary storage device 12. If at decision block 54 an error condition occurs or is otherwise indicated or some other type of interrupt occurs, the state indicator is set to the backup state.

Preferably, processes which are performing data transfer operations from a computer device to the primary storage device 12 continue to perform these operations even after the backup state is indicated, as long as there is available storage space on the primary storage device to accommodate the data transfers.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. A method for transferring data using an arbitrarily large number of processes in a networked system having a computer device coupled to a first storage device having a memory and connecting to a second storage device, said system capable of running multiple concurrent processes, said system including a state indicator for indicating at least a first state and a second state, said second state indicating a transfer of data from said first storage device to said second storage device, said method comprising the steps of:

creating one or more concurrent processes; and for each of said one or more processes,
determining whether said state indicator indicates a transfer of data from said first storage device to said second storage device,
if said state indicator indicates a transfer of data from said first storage device to said second storage device, then transferring data from said first storage device to said second storage device, and
if said state indicator does not indicate a transfer of data from said first storage device to said second storage device, then transferring data from a computer device to said first storage device, and if an error condition, interrupt or other transfer indication occurs during said data transfer, setting said state indicator to indicate a transfer of data from said first storage device to said second storage device, whereby other processes that are executing when the error condition, interrupt or other transfer indication occurs continue to execute and wherein said error condition, interrupt or other transfer indication occurs without regard to a precalculated specified storage threshold, said precalculated specified storage threshold indicating a memory size which is less than a size of the memory of said first storage device.

2. A method as in claim 1 wherein said process in which the state indicator is set transfers data from said first storage device to said second storage device after setting of the state indicator.

3. A method as in claim 1 wherein said process in which the state indicator is set terminates after setting of the state indicator.

4. A method as in claim 1 further comprising the step of resetting said state indicator to not indicate a transfer of data from said first storage device to said second storage device.

5. A method as in claim 1 further comprising the steps of:

setting a maximum number of processes that can transfer data concurrently from said first storage device to said second storage device;

tracking the number of processes transferring data from said first storage device to said secondary storage device; and when said tracked number of processes is equal to or greater than the maximum number of processes, setting said state indicator to not indicate a transfer of data from said first storage device to said second storage device.

6. A method for transferring data using an arbitrarily large number of processes in a networked system having a computer device coupled to a first storage device having a memory and connecting to a second storage device, said system capable of running multiple concurrent processes, said system including a state indicator for indicating at least a first state and a second state, said second state indicating a transfer of data from said first storage device to said second storage device, said method comprising the steps of:

creating one or more concurrent processes;

determining at the onset of each process whether a data transfer from the first storage device to the second storage device is indicated by the state indicator;

if said state indicator indicates a transfer of data from said first storage device to said second storage device, then within that process transferring data from said first storage device to said second storage device, if said state indicator does not indicate a transfer of data from said first storage device to said second storage device, then within that process transferring data from a computer device to said first storage device, and if an error condition, interrupt or other transfer indication occurs within a process during transfer of data to said first storage, setting said state indicator to indicate a transfer of data from said first storage device to said second storage device, said process in which the state indicator is set allowing other processes that are executing when the error condition, interrupt or other transfer indication occurs to continue to execute, wherein said error condition, interrupt or other transfer indication occurs without regard to a precalculated specified storage threshold, said precalculated specified storage threshold indicating a memory size which is less than a size of the memory of said first storage device.

7. A method as in claim 6 wherein said process in which the state indicator is set transfers data from said first storage device to said second storage device after setting of the state indicator.

8. A method as in claim 6 wherein said process in which the state indicator is set terminates after setting of the state indicator.

9. A method as in claim 6 further comprising the step of resetting said state indicator to not indicate a transfer of data from said first storage device to said second storage device.

10. A method as in claim 6 further comprising the steps of:

setting a maximum number of processes that can transfer data concurrently from said first storage device to said second storage device;

tracking the number of processes transferring data from said first storage device to said second storage device; and when said tracked number of processes is equal to or greater than the maximum number of processes, setting said state indicator to not indicate a transfer of data from said first storage device to said second storage device.

11. A method for transferring data using an arbitrarily large number of processes in a networked system having a computer device coupled to a first storage device having a memory and connecting to a second storage device, said system capable of running multiple concurrent processes, said method comprising the steps of:

creating one or more concurrent processes;

within each process, transferring data from a computer device to said first storage device, and if an error condition, interrupt or other transfer indication occurs during transfer of data to said first storage, then transferring data from said first storage device to said second storage device, said data transfer occurring within the process in which the error condition, interrupt or other transfer indication occurred, said data transfer occurring without blocking of other processes that are executing when the error condition, interrupt or other transfer indication occurs so that those other processes continue to execute, wherein said error condition, interrupt or other transfer indication occurs without regard to a precalculated specified storage threshold, said precalculated specified storage threshold indicating a memory size which is less than a size of the memory of said first storage device.

12. An apparatus for transferring data using an arbitrarily large number of processes, said apparatus comprising:

a first storage device having a central processing unit and a memory;

a second storage device having a plurality of external memory devices connected thereto;

a plurality of computer devices, each having a central processing unit and a memory;

networking means for interconnecting said first storage device, said second device and said plurality of computer devices, said networking means permitting the transfer of data from said plurality of computer devices to said first storage device and from said first storage device to said second storage device;

a state indicator in said memory of said first storage device, said state indicator having at least a first state and a second state, said second state indicating a data transfer from said first storage device to said second storage device;

means for creating one or more processes, at least two of said processes capable of executing concurrently;

means for determining whether said state indicator is in said second state;

first means for transferring data from one of said plurality of computer devices to said first storage device when said state indicator indicates such a transfer, said first means being coupled to said determining means;

second means for transferring data from said first storage device to said second storage device when said state indicator indicates such a transfer, said second means being coupled to said determining means; and means for setting said state indicator to said second state when an error condition, interrupt or other data transfer indication occurs, said process in which said error condition, interrupt or other data transfer indication occurs allowing other executing processes to continue to execute, wherein said error condition, interrupt or other transfer indication occurs without regard to a precalculated specified storage threshold, said precalculated specified storage threshold indicating a memory size which is less than a size of the memory of said first storage device.

13. An apparatus as in claim 12 wherein said process in which the state indicator is set transfers data from said first storage device to said second storage device after setting of the state indicator.

14. An apparatus as in claim 12 wherein said process in which the state indicator is set terminates after setting of the state indicator.

15. An apparatus as in claim 12 further comprising means for resetting said state indicator to not indicate a transfer of data from said first storage device to said second storage device.

16. An apparatus as in claim 12 further comprising:

means for setting a maximum number of processes that can transfer data concurrently from said first storage device to said second storage device;

means for tracking the number of processes transferring data from said first storage device to said second storage device; and means for comparing the tracked number of processes to the maximum number of processes, said comparing means being coupled to said state indicator such that when said tracked number of processes is equal to or greater than the maximum number of processes, said state indicator is set to not indicate a transfer of data from said first storage device to said second storage device.

17. An apparatus for transferring data using an arbitrarily large number of processes, said apparatus comprising:

a first storage device having a central processing unit and a memory;

a second storage device having a plurality of external memory devices connected thereto;

a plurality of computer devices, each having a central processing unit and a memory;

networking means for interconnecting said first storage device, said second device and said plurality of computer devices, said networking means permitting the transfer of data from said plurality of computer devices to said first storage device and from said first storage device to said second storage device;

means for creating one or more processes, at least two of said processes capable of executing concurrently;

first means for transferring data from said plurality of computer devices to said first storage device;

second means, coupled to said first means, for transferring data from said first storage device to said second storage device when an error condition, interrupt or other data transfer indication occurs during a data transfer to said first storage device, said process in which said error condition, interrupt or other data transfer indication occurs transferring data from said storage device to said second storage device and allowing other executing processes to continue to execute, wherein said error condition, interrupt or other transfer indication occurs without regard to a precalculated specified storage threshold, said precalculated specified storage threshold indicating a memory size which is less than a size of the memory of said first storage device.

* * * * *